Sept. 7, 1954

H. T. HODGES 2,688,279

FILM WINDING MECHANISM

Filed April 2, 1951

HOWARD T. HODGES
INVENTOR.

BY Daniel J. Mayne

J. Griffin Little
ATTORNEYS

Sept. 7, 1954 H. T. HODGES 2,688,279
FILM WINDING MECHANISM
Filed April 2, 1951 3 Sheets-Sheet 2
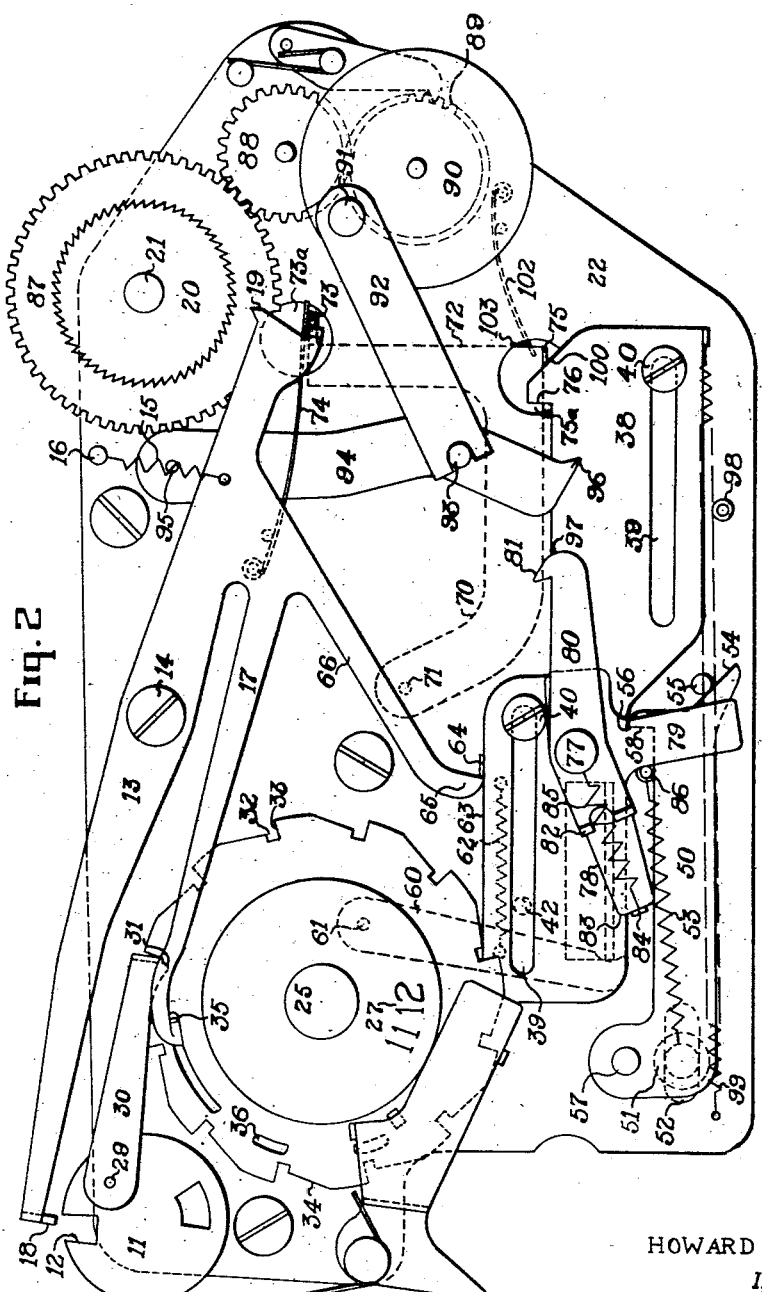
HOWARD T. HODGES
INVENTOR.
BY
ATTORNEYS Sept. 7, 1954  H. T. HODGES  2,688,279
FILM WINDING MECHANISM
Filed April 2, 1951  3 Sheets-Sheet 3
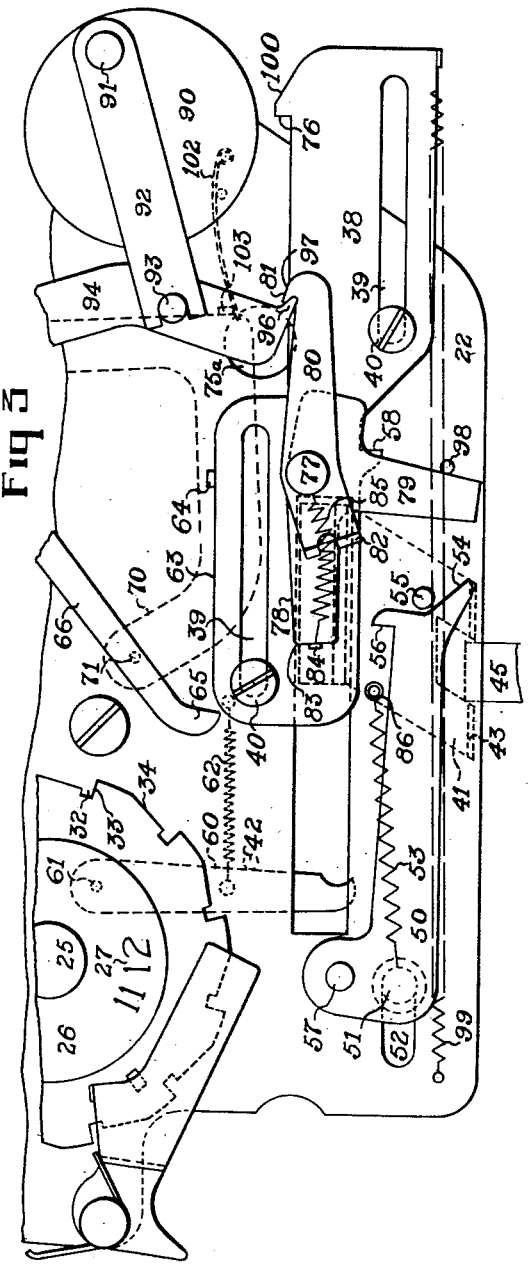
HOWARD T HODGES
*INVENTOR.*
BY
ATTORNEYS Patented Sept. 7, 1954

2,688,279

UNITED STATES PATENT OFFICE 2,688,279

FILM WINDING MECHANISM

Howard T. Hodges, Rochester, N. Y., assignor to Eastman Kodak Company, Rochester, N. Y., a corporation of New Jersey Application April 2, 1951, Serial No. 218,823

13 Claims. (Cl. 95—31)

The present invention relates to roll film cameras, and more particularly to a film metering and double exposure prevention device for such cameras.

As is well known, in cameras of this type, it is desirable to provide a device which will lock the film winding mechanism automatically at the end of each winding operation. After the exposure has been made, it is necessary to release the previously locked winding mechanism so that the exposed image area may be wound up onto the take-up spindle. In addition, it is desirable to provide an interlock between the shutter actuating mechanism and the film winding mechanism so that the shutter cannot be actuated a second time until the exposed film has been wound. Accordingly, the present invention provides an arrangement by which the locking of the film winding mechanism at the end of the film winding operation serves to unlock the shutter actuating mechanism so that the exposure may be made. The operation of the shutter thus serves to unlock the film winding mechanism and simultaneously lock the shutter actuating mechanism. In addition, winding of the film serves to connect the shutter setting mechanism automatically to the winding mechanism, so that the shutter is set while the film is being wound. After the shutter has been set, it is disconnected completely and automatically from said winding mechanism.

The present invention has as its principal object the provision of a novel and effective double exposure prevention device.

A still further object of the invention is the provision of a device of the class described, which is simple in structure, easy to operate, positive in its action, and highly effective in use.

Yet another object of the invention is the provision of an arrangement for connecting the shutter temporarily to the film winding mechanism so that the initial operation of the latter will serve to set the shutter. After the shutter is set, it is disconnected automatically and completely from the film winding mechanism.

To these and other ends, the invention resides in certain improvements and combinations of parts all as will be hereinafter more fully described, the novel features being pointed out in the claims at the end of the specification.

In the drawings:

Fig. 2 is a view similar to Fig. 1 but showing the relation of the parts at the end of the shutter tripping operation;

Fig. 3 is a partial view of the camera illustrated in Figs. 1 and 2 showing the arrangement for connecting the winding mechanism temporarily to the shutter for setting the latter, and Fig. 4 is a partial front elevation view of the structure illustrated in Fig. 3, showing the arrangement for connecting the sliding plate in operative relation with the shutter.

The same reference numerals throughout the various views indicate the same parts.

Figure 1:
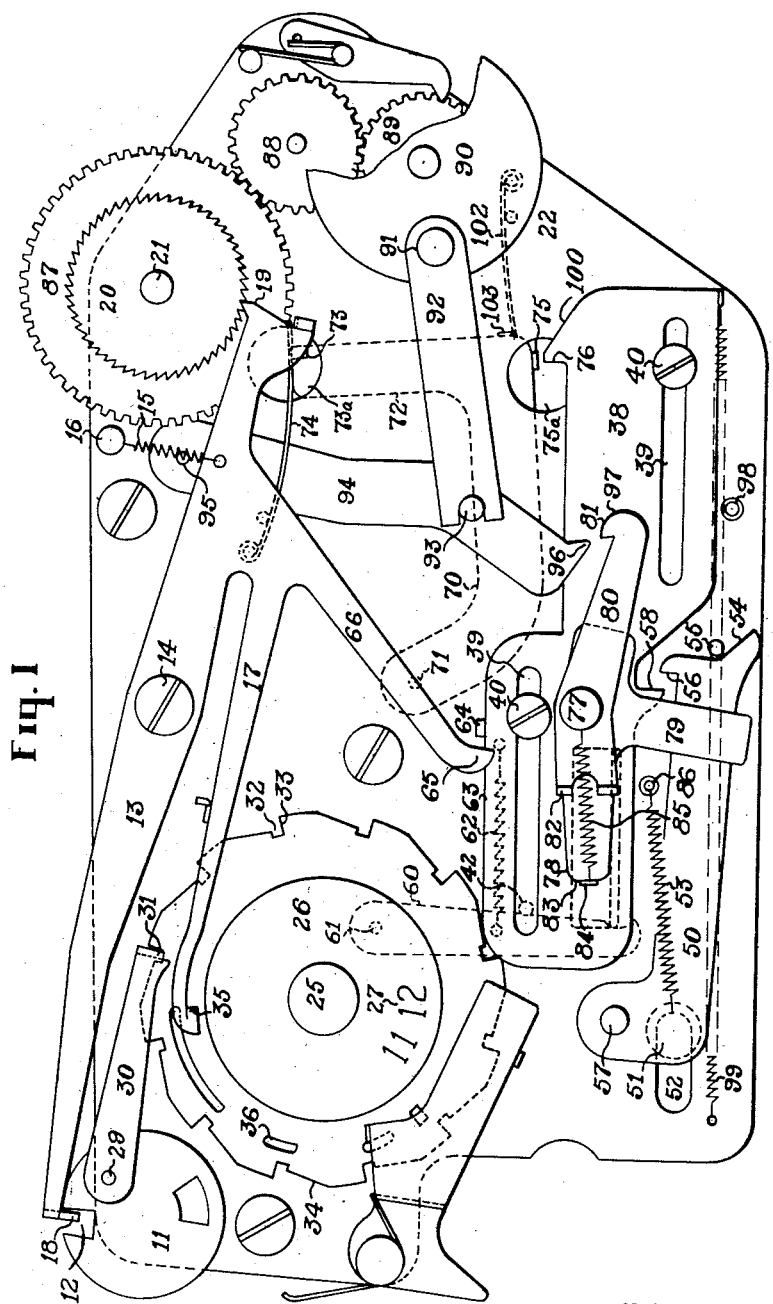
Fig. 1 is a side elevation view of a roll film camera with the side plate removed, showing the double exposure prevention device of the present invention, the parts being in the position occupied at the end of the film winding operation, with the winding mechanism locked and the shutter freed.

As is well known practice, a film strip is wound successively from a supply spool across an exposure area and is finally wound up on the take-up spool. During this passage across the camera, the film engages a measuring roll which is rotated by and in timed relation with the film movement. As such structures are well known and form no part of the present invention, they are not illustrated or described. However, the shaft of the measuring roll has mounted thereon a metering disk 11 which is of such a size as to make a single complete revolution when the film strip has been moved the distance of one image area, all of which is deemed apparent to those skilled in the art.

The disk 11 is formed with a radially extending open end slot or notch 12, the purpose of which will be later described. A locking or forward pawl 13 is pivoted at 14 on the camera. A spring 15 has one end anchored at 16 to the camera, and the other end fastened to pawl 13 formed with an arm 17. The spring 15 tends to rock the pawl 13, with its arm 17, in a counter-clockwise direction, about pivot 14, to move a lug 18 on the left of pawl 13 into engagement with periphery of disk 11. The other or right end of pawl 13 is formed with a tooth 19 adapted to engage a ratchet 20 fixed to the take-up spindle 21 to lock the latter against further movement at the end of each film winding operation. As mentioned above, disk 11 makes one revolution when the film strip is moved the distance of one image area. At this time the notch 12 has been moved into registry with the lug 18, and the pawl 13 rocks, under the action of spring 15, to move the lug 18 into notch 12. Such rocking simultaneously moves tooth 19 into locking relation with the ratchet 20 locking spindle 21 against further rotation, as shown in Fig. 1.

A stud 25 is rotatably mounted on the camera and has fixed thereto a counter dial 26 provided with annularly arranged designations or numerals 27 adapted to be positioned selectively in registry with an opening or window formed in the camera body to indicate the number of exposures made. In order that the dial 26 may be operative to indicate the exposures, it is detachably connected to and actuated by the metering disk 11 so as to be moved in proper timed relation and sequence to the movement of the film strip. To secure this result, the disk 11 has eccentrically mounted thereon, by means of a pin 29, one end of a metering pawl 30, the other or free end of which is formed with a pawl 31 adapted to engage in peripherally spaced notches or recesses 32 formed on the dial 26. These notches 32 are so formed that the trailing edges thereof extend radially to provide shoulders 33, while the leading edges are tapered as shown in 34. As the disk 11 makes one revolution for each film movement, a single reciprocation will be imparted to the metering pawl 30. Such reciprocation will cause the pawl 31 to engage in one of the notches 32 of the counter dial 26 to index the latter a distance of one numeral for each rotation of the metering disk. Thus, each time the film has been moved the distance of one image area, the counter dial is moved or indexed to bring the next number into position in registry with the window to indicate the number of the exposure made. As the counter dial 26 is moved or indexed each time the film is moved, the dial may be broadly considered as an indexing mechanism.

After the tooth 19 engages ratchet 20, as above described, the film is ready for an exposure, and the shutter may be operated to expose the positioned film area. After making the exposure, it is now necessary to wind up the exposed film. It is noted, however, that the parts are in the position shown in Fig. 1, and the take-up spindle is locked. Therefore, it is necessary to move the tooth 19 of the pawl 13 out of holding relation with the ratchet 20 before the exposed film can be wound up. Obviously this can be accomplished by imparting a clockwise rotation to the pawl 13. Such rotation will not only disengage tooth 19 from ratchet 20 to free the spindle 21, but also will withdraw the lug 18 out of the notch 12 of the disk 11 to free the latter and its connected counter dial 26. The structure so far described is identical to that shown in applicant's copending application Ser. No. 164,787, filed May 27, 1950, now Patent No. 2,652,209, issued September 15, 1953, and does not form, per se, a part of the present invention.

While a plurality of arrangements may be utilied to impart such clockwise rotation to pawl 13, the present invention secures such rotation by momentarily connecting the pawl 13 to the shutter trip mechanism so that when the shutter is tripped the pawl 13 will be moved to its released position shown in Fig. 2, as will be hereinafter more fully described. Suffice it to say at this point, when the pawl 13 is rocked clockwise tooth 19 is withdrawn from engagement with ratchet 20 to release the take-up spindle. While the pawl 13 is disengaged, it is apparent that spring 15 tends to rock the pawl in the opposite direction to move tooth 19 into engagement with ratchet 20. Therefore, after the shutter has been tripped and the pawl 13 moved to its released position, means must be provided for holding pawl 13 in its released position.

To secure this result, the pawl 13 has formed from the material thereof an auxiliary cantilever arm 17 which is arranged alongside of pawl 13. The free end of the arm 17 is formed with a downturned lug 35. Now, when the pawl 13 is rocked in a clockwise direction, in a manner to be later described, the lug 35 of the arm 17 moves radially or upwardly across the face of dial 26. Such movement serves to bring a surface on arm 17 into engagement with pawl 31 to lift the latter out of registering notch 32 of dial 26. This radial movement of lug 35 finally brings the latter into registry with one of a plurality of annularly arranged recesses 36. As the lug 35 drops into the registering recess it serves to hold the pawl 13 in its inoperative relation, shown in Fig. 2. As the spindle is rotated to wind up the film, the disk 11 imparts a reciprocating movement to metering pawl 30 to index dial 26 and to cam lug 35 out of the registering recess 36. The holding and releasing means for pawl 13 are substantially identical to that described and illustrated in the above-mentioned application Ser. No. 164,787, now Patent No. 2,652,209, issued September 15, 1953, and do not form, per se, a part of the present invention. Reference may be had to this application for more detailed descriptions of the holding and releasing mechanism. This structure has been set forth in the present application merely as a background for the structures of the present invention.

In order that the pawl 13 may be released only after the shutter has been tripped so as to prevent the winding of an unexposed image area, the present invention provides an arrangement for moving the pawl 13 to its released position only when the shutter is tripped. To this end, a slide plate 38 of the shape best shown in the drawings, is provided with a pair of parallel slots 39 adapted to receive screws 40 to mount the plate 38 for sliding movement on the mechanism plate 22. The under side of plate 38 has secured thereto a plate 41 having a downturned lug which extends through a slot in mechanism plate 22 and terminates in a pair of spaced fingers 43 which project parallel to plate 38 or toward the observer, as viewed in Fig. 4. A shutter is provided with a tripping and setting ring, not illustrated, which may be similar to that shown in applicant's copending application Ser. No. 197,055, filed November 22, 1950. This shutting and tripping ring is provided with a rearwardly projecting finger 45 which extends between fingers 43 to connect the shutter ring to the plate 38. As the shutter, per se, may be of any suitable or well known construction, it does not form a part of the present invention. Details thereof are not shown or described. The arrangement is such that when the plate 38 is slid to the left the shutter is tripped, while rightward movement of the plate sets the shutter.

A member 50 is positioned on the camera body below plate 38 and is formed with a depending pin 51 adjacent the left end of member 50. This pin is slidable in a slot 52 formed in the mechanism plate 22 to permit the member 50 to slide to the right or left, as viewed in Figs. 1–3. A spring 53 has one end anchored to plate 22, and the other end secured to pin 51 of member 50 and tends to move the latter to the right, as viewed in the drawings. The right end of member 50 is formed with a downwardly inclined cam surface 54 which is held in engagement with a pin 55 by spring 53. The upper right end of member 50 is formed with a lug 56.

Now, with the parts in the position shown in Fig. 1, in which the shutter is freed and the film winding mechanism is locked, the mechanisms are in a position to permit the actuation of the shutter to make an exposure. To make such an exposure a finger knob 57 on member 50 is grasped and the member 50 slid to the left. Such movement causes surface 54 to slide along pin 55 to rock member 50 in a counter-clockwise direction about its pin 51 to move lug 56 into engaging relation with a downwardly extending cooperating lug 58 on plate 38, as shown in Fig. 2. Thus the initial sliding movement of member 50 engages lugs 56 and 58 to connect member 50 to plate 38. A cantilever member 60 is pivoted at 61 on plate 22 and a spring 62 has one end anchored to plate 22 and the other end connected to member 60 to hold the latter in engagement with lug on plate 41. As the plate 38 is slid to the left, the member 60 is rocked in a clockwise direction about its pivot 61 against the action of spring 62.

Further leftward movement of plate 38 causes a lug 64 on the upper edge 63 of plate 38 to engage the free end 65 of a cantilever arm 66 formed on pawl 13 to move the arm 66 to rock pawl 13 in a clockwise direction about its pivot 14. Such movement serves to move tooth 19 out of engagement with ratchet 20 to free spindle 21 and also to shift lug 18 out of slot 12. Also, such clockwise movement of pawl 13 causes lug 35 to slide across the face of the counter dial 26 and finally engage in one of the recesses 36 to hold the pawl 13 in its released position, as shown in Fig. 2. At this point, member 50 is released by the operator, and is returned by spring 53 and cam surface 54 to its zero or inoperative position and out of engagement with plate 38 to free the latter. The member 60 is returned by its spring 62 into engagement with a pin 42.

An L-shaped locking lever 70 is pivoted at 71 to the under side of the camera mechanism plate 22 which carries the above-described mechanism. The end of the vertical arm 72 of lever 70 is provided with a lug 73 which extends through a registering opening 73a in plate 22 and engages the free end of a cantilever spring 74 which is carried by pawl 13 and tends to rock lever 70 in a clockwise direction about pivot 71. An intermediate portion of lever 70 is formed with an upstanding lug or ear 75 which extends through a registering aperture 75a in plate 22 and is adapted to cooperate with a lug 76 on plate 38 to prevent a second leftward actuation of the latter, as will be later described. When plate 38 has been moved to its extreme leftward position, the parts are then in the position shown in Fig. 2, with the lug 75 positioned to the right of lug 76. The plate 38 has pivoted thereon at 77 a rockable lever 78 which is formed with a depending finger 79. Also rockably mounted on pivot 77 of lever 78 is an element 80, the right end of which is formed with a hook 81. The left end of element 80 is formed with bifurcations 82 which are spaced to the right of the left end 83 of lever 78, as clearly illustrated in Figs. 1–3. The end 83 of lever 78 is formed with an upturned ear or lug 84 to which one end of a coil spring 85 is anchored. The coil spring extends between the bifurcations 82 and has the other end anchored to the stud which forms the pivot for lever 78 and element 80.

With the above-described parts in mind, it is apparent that when the plate 38 is moved to the left, as above described, the lever 78 and element 80 move as a unit therewith. Near the end of this leftward movement of plate 38, the finger 79 of lever 78 engages a fixed pin or stop 86 carried by plate 22. Such engagement imparts a counter-clockwise movement to lever 78 and causes the spring 85 to press on the lower bifurcation 82 to impart a counter-clockwise movement to element 80 to position hook 81 in the position shown in Fig. 2, for a purpose to be presently described. Prior to attaching lever 78 to plate 38, the left end of the lever is bent down or out of the plane of the lever. The result is that when the lever is mounted on plate 38, the left end of the lever will slide on and frictionally engage plate 38. The effect of such an arrangement is that lever 78 will stay put when moved and will "remember" whether the shutter has tripped or set.

In addition to the ratchet 20, spindle 21 has mounted thereon a gear 87 which is connected through a gear 88 to a gear 89 so that when spindle 21 is rotated to wind the film, the entire gear train is rotated. Spindle 21 may be rotated by a suitable knob or crank, not shown. The gear 89 carries a disk 90 to which is eccentrically connected at 91 one end of a crank 92, the other end of which is pivotally connected at 93 to an intermediate point of an oscillatable lever 94 pivoted at 95 on plate 22. The free end of lever 94 is formed with a hook 96. It will now be apparent that when the spindle 21 is rotated to wind up the film, the gear train will be actuated and will serve to reciprocate crank 92 and impart an oscillating movement to hook 96.

It will be remembered that when plate 38 was moved to the left to trip the shutter, lever 78 and element 80 were rocked in a counter-clockwise direction. Such rotation will place hook 81 in the path of hook 96. Now, as the spindle 21 is rotated the hook 96 will move to the left and will engage the inclined surface 97 of hook 81. Such engagement will cause element 80 to rock slightly in a clockwise direction to permit hook 96 to pass over hook 81. After hook 96 passes over hook 81, the latter under the action of spring 85 snaps up behind and into the path of hook 96. Now, as the rotation of spindle 21 is continued, the lever 94 and hook 96 will finally move to the right until the latter engages hook 81 as shown in Fig. 3, to connect plate 38 to the film winding mechanism. Continued rotation of spindle 21 will then move plate 38 to the right to set the shutter. Near the end of this rightward movement the finger 79 of lever 78 will engage a second fixed stop or pin 98 carried by plate 22. Such engagement will impart a clockwise movement to lever 78 to move the spring 85 against the upper bifurcation 82. Such engagement tends to turn element 80 in a clockwise direction. However, by reason of the engagement of hook 96 with hook 81, the element 80 is held against turning. However, as the film winding continues the hook 96 will finally begin to move to the left. Such movement will release hook 81, whereupon element 80 rocks in a clockwise direction to move hook 81 out of the path of hook 96 to disconnect plate 31 completely from the winding mechanism to free plate 38. The latter then moves under action of spring 99 back to its zero position shown in Fig. 1.

As the winding continues, the lever 94 and hook 96 merely oscillate idly. At the end of the film winding operation the lug 18 finally drops into slot 12 to rock pawl 13 counterclockwise to move tooth 19 into engagement with ratchet 20. Thus, during the initial winding of the film the film winding mechanism is connected to plate 38 to move the latter to the right to set the shutter. However, after the shutter has been set, the plate 38 is automatically and completely disconnected from the winding mechanism and the latter may be operated to complete the winding of the film. A spring 99 serves to return the disconnected plate 38 to its zero or inoperative position, Fig. 1. Thus, the winding of the film is utilized to set the shutter, and the tripping of the latter releases the winding mechanism.

It will be remembered that when the plate 38 is slid to the left to trip the shutter, the pawl 13 is rocked to its inoperative position as shown in Fig. 2. Such movement of pawl 13 will cause spring 74 to act on the lug 73 to move lever 70 in a clockwise direction about its pivot 71. Such movement of lever 70 will position the lug 75 of lever 70 to the right of lug 76 of plate 38, as shown in Fig. 2. Now, as the latter is returned to the right to its zero position by means of arm 60 and springs 62 and 53, the lug 75 will engage an inclined cam surface 100 to rock lever 70 in a counter-clockwise direction until the lug 75 finally drops behind the shoulder or lug 76 formed on plate 38 to prevent a second leftward or tripping movement of the plate 38. Thus, after the shutter has been actuated, it is locked against further tripping movement until the exposed area is wound. However, when the winding of the film is completed, the pawl 13 will be returned to its locked position as shown in Fig. 2, and this movement will release the pressure of spring 74 and lug 73. At this time, a spring 102 comes into action. This latter spring has one end anchored to plate 22 and the other end engages a lug 103 formed on the right edge of lever 70. The spring 102 then serves to rock lever 70 in a counter-clockwise direction to move lug 75 out of holding relation with the shoulder or lug 76. Thus, at the end of the winding operation the winding mechanism is locked and the shutter released.

The present invention thus provides an interlock between the shutter tripping and the film winding mechanism whereby the tripping of the shutter releases the film and locks the shutter. However, during the final portion of the winding mechanism is connected to the shutter to set the latter, and after the shutter is set it is disconnected completely and automatically from the winding mechanism. The operation of the latter is then continued to complete the winding of the film.

While one embodiment of the present invention has been disclosed, it is understood that the inventive idea may be carried out in a number of ways. This application is, therefore, not to be limited to the precise details described, but is intended to cover all variations and modifications which fall within the scope of the appended claims.

What I claim and desire to secure by Letters Patent of the United States of America is:

1. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, and means actuated by said mechanism for setting said shutter from said mechanism and during the film winding.

2. In a roll film camera, the combination with a camera body, a film winding mechanism mounted on said body, means for locking said mechanism automatically at the end of each winding operation, of a shutter setting and tripping plate slidable on said body, means for connecting said plate to said shutter, means for sliding said plate in one direction to trip said shutter, means controlled by said sliding of said plate to move said locking means to a released position when said shutter is tripped and means for releasably connecting said plate to said mechanism so that the operation of the latter in winding the film will slide said plate in the opposite direction to set said shutter.

3. In a roll film camera, the combination with a camera body, a film winding mechanism mounted on said body, means for locking said mechanism automatically at the end of each winding operation, of a shutter setting and tripping plate slidable on said body, means for connecting said plate to said shutter, means for sliding said plate in one direction to trip said shutter, means controlled by said sliding of said plate to move said locking means to a released position when said shutter is tripped, means for releasably connecting said plate to said mechanism so that the operation of the latter in winding the film will slide said plate in the opposite direction to set said shutter, and means for disconnecting said plate from said mechanism when said shutter is set.

4. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, a rockable member carried by said plate, and means for releasably connecting said member to said mechanism when the latter is actuated to wind the film to connect said plate to said mechanism to render the latter operative to slide said plate in the opposite direction to set said shutter.

5. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, a rockable member carried by said plate, means for releasably connecting said member to said mechanism when the latter is actuated to wind the film to connect said plate to said mechanism to render the latter operative to slide said plate in the opposite direction to set said shutter, and means to disconnect said plate from said mechanism when said shutter has been set.

6. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, means to return said plate to a zero position, means engaging said plate to lock the latter in said zero position to prevent further tripping movement of said plate, means for releasably connecting said plate to said mechanism so that the operation of the latter to wind the film will slide said plate in the opposite direction to set said shutter, and means controlled by the mechanism for releasing said locking means to free said plate at the end of the film winding operation.

7. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, an oscillatable lever operatively connected to said mechanism, and a pivoted hook carried by said plate and engageable with said lever to connect said plate to said mechanism to move said plate in the opposite direction to set said shutter during film winding.

8. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, an oscillatable lever operatively connected to said mechanism, a pivoted hook carried by said plate and engageable with said lever to connect said plate to said mechanism to move said plate in the opposite direction to set said shutter during film winding, and means for disconnecting said hook from said lever when said shutter has been set.

9. In a roll film camera, the combination with a camera body, a film winding mechanism mounted on said body, means for locking said mechanism automatically at the end of each winding operation of a shutter setting and tripping plate slidable on said body, means for sliding said plate in one direction to trip said shutter, means controlled by said sliding of said plate to move said locking means to a released position when said shutter is tripped, an oscillatable lever operatively connected to said mechanism, a pivoted hook carried by said plate and releasably connectable to said lever upon operation of said mechanism to connect said plate to said mechanism to render the latter operative to move said plate in the opposite direction to set said shutter during film winding, and means automatically pivoting said hook to disconnect the latter from said lever when said shutter has been set.

10. In a roll film camera, the combination with a camera body, a film winding mechanism mounted on said body, means for locking said mechanism automatically at the end of each winding operation of a shutter setting and tripping plate slidable on said body, means for sliding said plate in one direction to trip said shutter, means controlled by said sliding of said plate to move said locking means to a released position when said shutter is tripped, an oscillatable lever operatively connected to said mechanism, a pivoted hook carried by said plate and releasably connectable to said lever upon operation of said mechanism to connect said plate to said mechanism to render the latter operative to move said plate in the opposite direction to set said shutter during film winding, and means on said body for pivoting said hook to disconnect the latter from said lever to free said plate when said shutter has been set.

11. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, an oscillatable lever operatively connected to said mechanism, a pivoted hook carried by said plate, means operative when said plate is slid in said one direction to pivot said hook to position the latter in the path of said lever, means for connecting said lever to said hook when said mechanism is operated to connect the latter to said plate to slide said plate in the opposite direction to set said shutter, and means to disconnect said hook automatically from said lever to free said plate when said shutter has been set.

12. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, an oscillatable lever operatively connected to said mechanism, a pivoted lever carried by said plate, a hook pivoted on said plate for movement relative thereto, means to connect said hook resiliently to said pivoted lever, means operative when said plate is moved in said one direction to rock said pivoted lever to tension said resilient means to move said hook relative to said pivoted lever to position said hook in the path of said oscillatable lever to be engaged thereby to connect said mechanism to said plate to shift the latter in the opposite direction to set said shutter, and means for rocking said pivoted lever when said plate has been moved in said opposite direction to tension said resilient means which serves to disconnect said hook from said oscillatable lever to free said plate.

13. In a roll film camera, the combination with a camera body, a film winding mechanism mounted on said body, means for locking said mechanism automatically at the end of each winding operation, of a shutter setting and tripping plate slidable on said body, means for sliding said plate in one direction to trip said shutter, means controlled by said sliding of said plate to move said locking means to a released position when said shutter is tripped, an oscillatable lever operatively connected to said mechanism, a pivoted lever carried by said plate, a hook pivoted on said plate for movement relative thereto, means to connect said hook resiliently to said pivoted lever, a depending finger on said pivoted lever, a fixed stop on said body positioned in the path of said finger and engaged thereby when said plate is slid in said one direction to pivot said pivoted lever relative to said hook to tension said resilient means, said tensioned resilient means serving to rock said hook to position the latter in the path of said oscillatable lever so that upon actuation of said mechanism said oscillatable lever will pick up and engage said hook to connect said mechanism to said plate to slide the latter in the opposite direction to set said shutter, and a second fixed stop on said body positioned in the path of said finger and engaged thereby when said plate is moved in said opposite direction to rock said pivoted lever relative to said hook to tension said resilient means, said tensioned means serving to rock said hook relative to said pivoted lever to disconnect said hook from said oscillatable lever to free said plate.

References Cited in the file of this patent

FOREIGN PATENTS

| Number | Country | Date |
| --- | --- | --- |
| 598,202 | Great Britain | Feb. 12, 1948 |